Oct. 11, 1960 A. BELCHETZ 2,955,920
DECARBONIZATION OF SPENT ACIDS
Filed Oct. 14, 1955
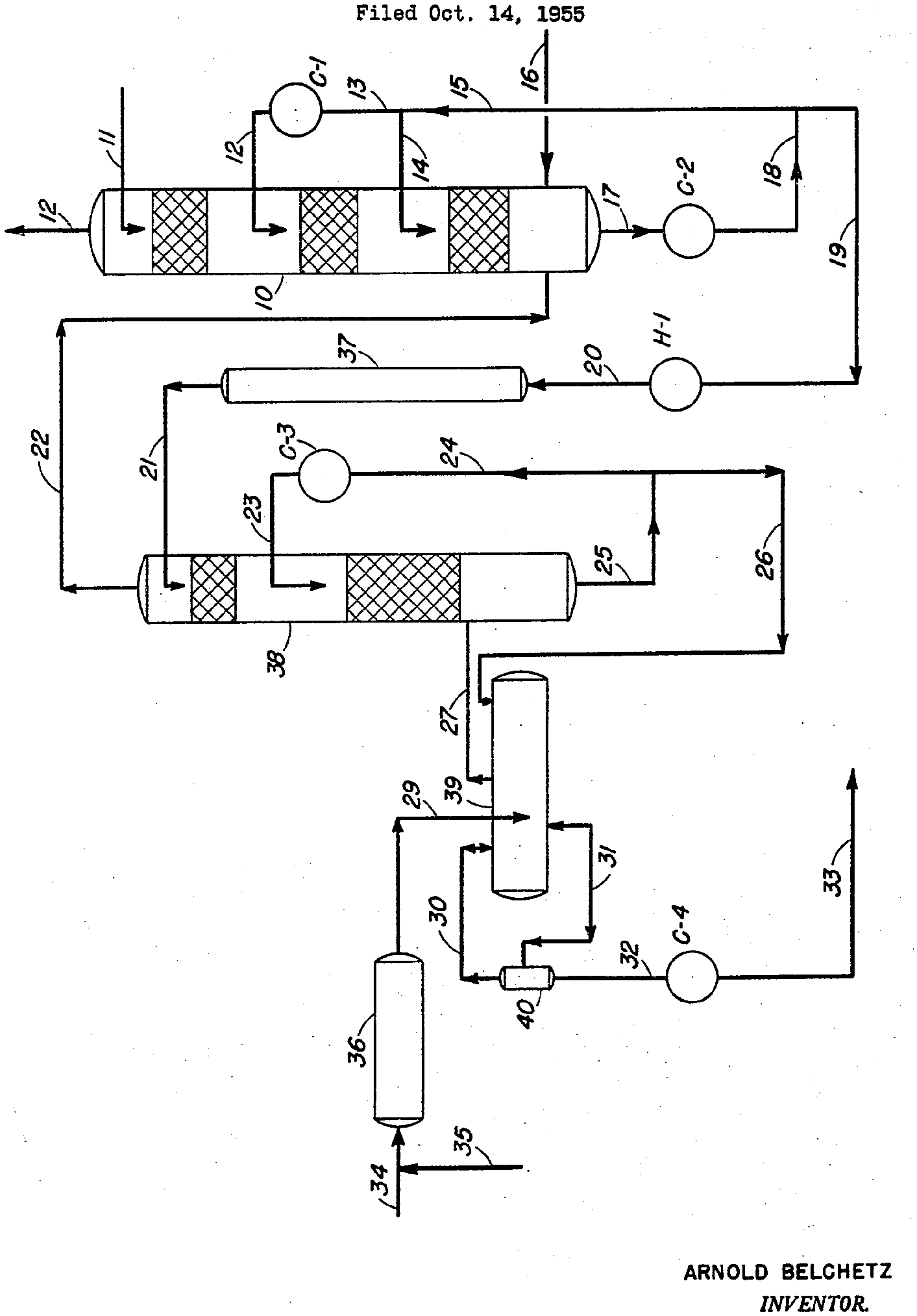
ARNOLD BELCHETZ
*INVENTOR.*
BY Mitchell G. Condos United States Patent Office 2,955,920

Patented Oct. 11, 1960

2,955,920

DECARBONIZATION OF SPENT ACIDS

Arnold Belchetz, Larchmont, N.Y., assignor to National Distillers and Chemical Corporation, New York, N.Y., a corporation of Virginia Filed Oct. 14, 1955, Ser. No. 540,495

8 Claims. (Cl. 23—172)

The present invention relates to a process for regenerating spent acids and, more particularly, to a process for deodorizing and decarbonizing spent sulfuric acids containing carbonaceous matter.

In many processes utilizing sulfuric acid, spent sulfuric acid is obtained contaminated with carbonaceous matter that imparts undesirable color and odor characteristics to the acid. This contamination renders the spent acid unsuitable for further use in the process from which it was obtained and for other uses, unless the carbonaceous matter is substantially or completely removed. Illustrative of processes from which such carbon containing sulfuric acids are obtained are alkylation processes, in which sulfuric acid is used as a catalyst for alkylation of isoparaffins with olefins; petroleum refining processes, in which sulfuric acid is used for treatment of petroleum fractions, such as cracked distillates and lubricating oils; and nitration processes, in which sulfuric acid-nitric acid mixtures are used for the nitration of aromatic hydrocarbons.

Spent sulfuric acid is also obtained from olefin hydration processes for production of alcohols, in which an olefin, such as ethylene, is absorbed in sulfuric acid to form the sulfuric acid ester of the olefine. The acid solution of the ester is diluted with water and hydrolyzed to form the alcohol and sulfuric acid from the ester. The alcohol is removed from the dilute sulfuric acid solution by stripping, usually with the aid of steam. The residual acid from the stripping operation is normally a dark colored, relatively weak acid containing about 50% $H_2SO_4$. The spent, stripped alcohol acid usually contains less than 1% carbonaceous matter. If the spent acid is allowed to settle, a layer of sludge acid, containing a relatively high proportion of carbonaceous matter, separates on top of the main bulk of the spent 50% acid. This alcohol sludge acid contains about 5 to 7 weight percent of carbonaceous matter in 50% $H_2SO_4$.

The bottom layer of spent 50% acid is generally concentrated to an acid strength of about 78%. This partially concentrated acid, commonly referred to as "alcohol black acid," generally contains less than one percent by weight of carbonaceous matter and is potentially useful for fertilizer manufacture, in processes such as the acidulation of phosphate rock to produce superphosphate. It can also be further concentrated or fortified with sulfur trioxide to higher strength, for reuse in the olefin hydration process from which it was derived. Although such alcohol black acids are potentially useful for these purposes, their utility therefor is impaired by the presence of the carbonaceous matter, which causes undesirable color and odor characteristics, even though the carbonaceous matter content may be as low as about 0.3 weight percent. The alcohol sludge acids containing 5 to 7% carbonaceous matter, are markedly impaired by their high content of carbonaceous matter and are often disposed of as waste, presenting a waste disposal problem, in addition to a loss of valuable acid values. So far as I am aware, an effective, economically attractive method for reconditioning alcohol sludge acids, as substantially decolorized, decarbonized sulfuric acid, is not available.

The main purpose of the present invention is to provide an efficient, economical process for decolorizing and decarbonizing spent sulfuric acid containing carbonaceous matter and to produce therefrom regenerated acid of enhanced value and utility. Other objects and advantages that result from practice of the present invention will be apparent from the description of the invention which follows.

In accordance with this invention, spent sulfuric acid, containing carbonaceous matter, is effectively decolorized and decarbonized by contacting the spent acid, in which the proper amount of a suitable oxide of nitrogen is dissolved, with a mixture of an oxygen-containing gas and sulfur dioxide, under conditions whereby the carbonaceous matter is effectively oxidized and removed from the acid and the sulfur dioxide is oxidized to sulfur trioxide. More specifically, the process comprises contacting an aqueous solution of spent sulfuric acid, containing in solution approximately 3 to 10 weight percent of a suitable oxide of nitrogen, with an oxygen-containing gas, such as oxygen or air, and sulfur dioxide, under conditions whereby the sulfur dioxide and a portion of the oxygen dissolve in the acid. Part of the dissolved oxygen is used to oxidize the dissolved $SO_2$ to $SO_3$ in the liquid phase and the balance of the dissolved oxygen serves to oxidize the carbonaceous matter to $CO_2$ and water. The $SO_3$, which is formed, reacts with water which is present in spent acid feed or which is formed by oxidation of carbonaceous matter, to form sulfuric acid. Following the decarbonization treatment, the sulfuric acid is stripped of dissolved nitrogen oxides, to obtain a decarbonized, decolorized product containing the sulfuric acid originally present in the spent acid fed to the system, as well as the additional sulfuric acid produced from $SO_2$ during the decarbonizing treatment.

Still more specifically, the invention relates to a continuous process in which spent sulfuric acid, containing carbonaceous matter, is continuously added to a solution of dinitrogen trioxide in sulfuric acid of from 80 to 90% $H_2SO_4$ content, and the resulting acid mixture is contacted with an oxygen-containing gas and sulfur dioxide, under conditions whereby oxygen and sulfur dioxide dissolve in the acid mixture, carbonaceous matter is oxidized to carbon dioxide and water, sulfur dioxide is oxidized to $SO_3$, and $SO_3$ reacts with water present in the spent acid feed or formed in the oxidation of the carbonaceous matter to form sulfuric acid, thus maintaining the sulfuric acid content of the acid mixture at a strength of from 80 to 90% $H_2SO_4$ In preferred embodiment, decarbonization of spent sulfuric acid is effected under conditions where the acid being decarbonized is maintained at a strength of about 82 to 86% $H_2SO_4$, with approximately 5 to 7% by weight of dinitrogen trioxide in solution in the acid, by contacting the 82 to 86% strength acid containing $N_2O_3$ and carbonaceous matter, with air and sulfur dioxide at a temperature of approximately 100° to 300° F., or higher. Sufficient air is used to oxidize the sulfur dioxide to sulfur trioxide and the carbonaceous matter to carbon dioxide and water and, preferably, to provide an excess of about 5 mol percent of unreacted oxygen in the residual gas from the decarbonization operation. Water in the spent acid feed or formed by oxidation of the carbonaceous matter in the process, is utilized for reaction with the sulfur trioxide formed by oxidation of $SO_2$ in the system. Sufficient $SO_2$ is oxidized to $SO_3$, to maintain the acid strength at from 82 to 86% $H_2SO_4$ for the decarbonization operation.

Further embodiments of the invention relate to the use of the feed gases, obtained by burning sulfur with an excess of air, for concentration and denitration of the decarbonized acid, and to the use of the gases from the denitration operation for supply of sulfur dioxide, nitrogen oxides and oxygen to the decarbonizing operation.

To illustrate practice of an embodiment of the invention, reference is made to the accompanying drawing, which is a schematic illustration of an assemblage of apparatus suitable for practice of the invention. With reference to the aspect of the invention relating to decarbonization of spent sulfuric acid containing carbonaceous matter, decarbonization may be carried out in tower 10 which, as shown, contains three packed sections. The bottom section of tower 10 serves as a reactor-oxidizer, in which the carbonaceous matter in the spent acid feed is oxidized and in which a substantial amount of the $SO_2$ introduced into the tower is converted to sulfuric acid. The middle section serves as a reactor to convert the remainder of the $SO_2$ to sulfuric acid. The top section of tower 10 serves as an absorber for the nitrogen oxides which are contained in the gases leaving the middle section. These nitrogen oxides are absorbed almost completely in the spent sulfuric acid fed to tower 10, as described hereinafter.

Spent acid feed is introduced into tower 10 above the top section through line 11. A gaseous stream, containing oxygen, oxides of nitrogen and $SO_2$, is introduced into tower 10 below the bottom section through line 22. Decarbonized acid is withdrawn from tower 10 through line 17, located at the bottom of the tower, and residual gases are withdrawn from tower 10 via line 12, located at the top of the tower. The decarbonized acid, withdrawn from tower 10 through line 17, is passed through cooler C–2 into line 18. Part of the acid from line 18 is recycled to tower 10 through line 15 and part is withdrawn from the decarbonization operation through line 19. The acid recycled to tower 10 through line 15, is further divided between lines 14 and 13. The acid passing through line 14, enters tower 10 midway between the middle and bottom sections. The acid from line 13 passes through the cooler C–1 and enters tower 10 between the top and middle sections.

The following example illustrates practice of the invention for continuous decarbonization of 78% strength alcohol black acid, having the following composition, and introduced into tower 10 at a temperature at 90° F. through line 11, at the rate of approximately 100 tons $H_2SO_4$ per day (100% basis).

*Alcohol black acid feed entering tower 10 through line 11*

| Composition | Wt. percent | Lbs./hr. | Tons/day |
|---|---|---|---|
| $H_2SO_4$ | 77.6 | 8,320 | 99.84 |
| $H_2O$ | 21.9 | 2,346 | 28.15 |
| $(CH_2)_n$ | 0.5 | 54 | 0.65 |
| Total | 100.0 | 10,720 | 128.64 |

The sulfuric acid in the bottom section of tower 10 is maintained at a strength of 85% $H_2SO_4$ and contains 6 weight percent $N_2O_3$ in solution. The temperature of the of the acid withdrawn through line 17 is 225° F.

A gaseous stream, prepared as described hereinafter, is introduced into tower 10 at a temperature of 300° F. and under a pressure of 6 p.s.i.g. The gaseous stream, which is of the following composition, is passed into tower 10 at a rate of 10,352 pounds per hour or approximately 2100 c.f.m. measured at the flowing conditions of 300° F. and 6 p.s.i.g. pressure. The gas flows upwards through the tower, thus contacting the downward flowing acid, introduced through lines 11, 12 and 14.

*Composition and quantity of gas introduced in tower 10 through line 22*

| | Mol percent | Mols/hr. | Lbs./hr. |
|---|---|---|---|
| NO | 3.3 | 10.5 | 316 |
| $NO_2$ | 3.3 | 10.5 | 484 |
| $SO_2$ | 9.1 | 29.1 | 1,864 |
| $O_2$ | 10.4 | 33.4 | 1,068 |
| $N_2$ | 73.9 | 236.5 | 6,620 |
| Total | 100.0 | 320.0 | 10,352 |

The gas from line 22 enters tower 10 at approximately 300° F. and is cooled to about 160° F. as it passes upwardly through the bottom section of the tower. In the bottom section, the gas is subjected to intimate contact with a mixture of acid, part of which is acid flowing from the middle section to the bottom section at a temperature of approximately 160° F. and part of which is acid circulated to tower 10 through line 14 at 160° F. The acid cools the gas to approximately 160° F., before the gas passes from the bottom to the middle section, and, in doing so, the acid absorbs part of the NO, $NO_2$, $SO_2$ and oxygen which enter tower 10 through line 22. The NO and $NO_2$ are absorbed in approximately equimolar quantities in the sulfuric acid and combine in solution to form $N_2O_3$, which in turn forms a stable complex with $SO_3$ or $H_2SO_4$. This complex has a very low vapor pressure in sulfuric acid of about 85% strength and is a very powerful oxidizing agent. While I do not wish to be bound by any theories relating to the nature of this complex, it is believed that the complex has a composition corresponding to the formula $N_2O_3.2SO_3$.

Approximately half of the $SO_2$ which enters tower 10 through line 22 is absorbed in the acid in the bottom section and is immediately oxidized to $SO_3$ by the $N_2O_3$ in the acid solution. The $N_2O_3$ in turn is reduced to 2NO, which is then immediately reoxidized to $N_2O_3$ by oxygen which dissolves in the acid solution. Thus, the net effect is the oxidation of $SO_2$ to $SO_3$ by oxygen which is absorbed with the $SO_2$ in sulfuric acid-$N_2O_3$ solution.

$$N_2O_3+SO_2 \rightarrow 2NO+SO_3$$
$$2NO+\tfrac{1}{2}O_2 \rightarrow N_2O_3$$

The $SO_3$ formed combines with water in the acid solution to form $H_2SO_4$.

The $N_2O_3$ in the acid solution also oxidizes the carbonaceous matter in the acid passing from the middle section of tower 10 to the bottom section. The carbonaceous matter is oxidized to $CO_2$ and $H_2O$ by the $N_2O_3$, which is reduced to 2NO and is again immediately reoxidized to $N_2O_3$ by oxygen dissolved in the acid from the gas. Thus, the net effect is the oxidation of carbonaceous matter by means of oxygen contained in the gas entering tower 10 through line 22.

A number of highly exothermic reactions occur in the bottom section of tower 10, as follows:

(1) The reaction of NO and $NO_2$ to form $N_2O_3$, the heat of solution of $N_2O_3$ in sulfuric acid and the heat of formation of the complex $N_2O_3.2SO_3$.

(2) The oxidation of $SO_2$ to $SO_3$ and the reaction of $SO_3$ with water to form $H_2SO_4$.

(3) The heat of dilution of $H_2SO_4$ formed to approximately 85% $H_2SO_4$ strength.

(4) The oxidation of carbonaceous matter in the acid to $CO_2$ and $H_2O$.

All of the heat evolved in these reactions is absorbed by the acid which contacts the gas. The acid also absorbs the sensible heat liberated in cooling the gas from 300° to 160° F. As a result the temperature of the acid rises as it flows down the bottom section, from approximately 160° F. to about 225° F. The acid withdrawn from the bottom of tower 10 has a strength of approximately 85% $H_2SO_4$ and contains about 6 wt. percent $N_2O_3$ in solution. It has been found that in an acid of this composition, oxidation of carbonaceous matter proceeds very rapidly at a temperature of 225° F.

Approximately 112,300 pounds per hour of decarbonized 85% $H_2SO_4$ containing 6% $N_2O_3$, is withdrawn from tower 10 through line 17 and is cooled in C–2 to about 160° F. before entering line 18. About 88% of the acid entering line 18, or approximately 98,400 pounds per hour, is returned to tower 10 through line 15, and the rest of the acid, amounting to 13,880 pounds per hour, is withdrawn through line 19 for denitration and recovery of the contained $N_2O_3$ for further use. The decarbonized acid withdrawn through line 19 has the following composition:

*Composition of acid entering line 19*

| | Wt. percent | Lbs./hr. | Tons/day |
|---|---|---|---|
| $H_2SO_4$ | 85 | 11,120 | 133.44 |
| $H_2O$ | 15 | 1,960 | 23.52 |
| Total $H_2SO_4+H_2O$ | 100 | 13,080 | 156.96 |
| $N_2O_3$ | 6.1 | 800 | 9.60 |
| Total Acid | | 13,880 | 166.56 |

Of the 98,400 pounds per hour of acid entering line 15 at approximately 160° F., 37,100 pounds per hour is recycled to tower 10 through line 14 and 61,300 pounds per hour enters line 13. The acid entering line 13 passes through the cooler C–1 where the temperature is reduced from 160° F. to approximately 122° F. From C–1 the acid passes through line 12 and enters the tower 10 at a temperature of approximately 122° F. at a point between the top and middle sections. The acid from line 12 is mixed with the acid of approximately 78% strength which flows from the top section to the middle section at a temperature of about 122° F. The acid from the top section consists of the alcohol black acid feed entering tower 10 through line 11 and a small amount of nitrogen oxides, approximately 100 lbs./hr., which escape from the middle section in the gas entering the top section and are absorbed in the black acid feed in the top absorber section. The following is the approximate quantity and composition of the acid at the top of the middle section.

| | Alcohol Black Acid from Top Section | | Recycle Acid to Middle Section | | Total Acid to Middle Section | |
|---|---|---|---|---|---|---|
| | Wt. percent | Lbs./Hr. | Wt. percent | Lbs./Hr. | Wt. percent | Lbs./Hr. |
| $H_2SO_4$ | 78 | 8,320 | 85 | 49,110 | 84 | 57,430 |
| $H_2O$ | 22 | 2,346 | 15 | 8,665 | 16 | 11,011 |
| | 100 | 10,666 | 100 | 57,775 | 100 | 68,441 |
| $(CH_2)_n$ | 0.5 | 54 | | | 0.08 | 54 |
| $N_2O_3$ | 0.9 | 100 | 6.1 | 3,525 | 5.0 | 3,625 |
| Total | | 10,820 | | 61,300 | | 72,120 |

It will be noted that the acid entering the middle section consists of 84% strength sulfuric acid with about 5% $N_2O_3$ and 0.08% carbonaceous matter in solution. As this acid flows down the middle section, the balance of the $SO_2$ entering tower 10 through line 22 and not absorbed and oxidized in the bottom section, is absorbed in the acid and oxidized to $SO_3$. By the time the acid leaves the bottom of the middle section, the strength of the acid will have increased to about 84.5% $H_2SO_4$, the $N_2O_3$ content will have increased to about 6 wt. percent, and the temperature will have increased to approximately 160° F. The temperature increase is due to the absorption of heat liberated in the middle section in oxidizing about half of the $SO_2$ entering tower 10 through line 22 to $SO_3$, the reaction of the $SO_3$ formed with water to form $H_2SO_4$ and the dilution of the $H_2SO_4$ formed from 100% to 84.5% $H_2SO_4$. The acid also absorbs the heat liberated in cooling the gas entering the middle section from 160° F. to 122° F. In addition about 200 lbs./hr. of nitrogen oxides or about 25% of the nitrogen oxides which enter tower 10 through line 22 are absorbed in the acid in the middle section, with consequent liberation of heat in the formation of $N_2O_3$ and the reaction of the $N_2O_3$ with $SO_3$ to form the complex $N_2O_3.2SO_3$. Against these exothermic reactions, some heat is absorbed in raising the $H_2SO_4$ content of the alcohol black acid feed from 78% to about 84.5% $H_2SO_4$.

The $H_2SO_4$ produced from oxidation of 50% of the $SO_2$, or 914 lbs./hr. $SO_2$, to $SO_3$ will be approximately 1400 lbs./hr. in the middle section. This will remove 257 lbs./hr. of free water, by reaction with $SO_3$ to form $H_2SO_2$. Only a small amount of oxidation of carbonaceous matter occurs in the middle section, as compared with the bottom section, due to the lower temperature in the middle section. The composition of the acid leaving the middle section will be approximately as follows, neglecting the small amount of water formed by oxidation of carbonaceous matter in the middle section.

| | Acid Entering Middle Section | | Absorbed in Middle Section, lbs./hr. | Acid Leaving the Middle Section | |
|---|---|---|---|---|---|
| | Wt. percent | Lbs./hr. | | Wt. percent | Lbs./hr. |
| $H_2SO_4$ | 84 | 57,430 | 1,400 | 84.5 | 58,830 |
| $H_2O$ | 16 | 11,011 | (−257) | 15.5 | 10,754 |
| | 100 | 68,441 | | 100.0 | 69,584 |
| $(CH_2)_n$ | 0.08 | 54 | | 0.08 | 54 |
| $N_2O_3$ | 5.0 | 3,625 | 200 | 5.5 | 3,825 |
| Total | | 72,120 | 1,343 | | 73,463 |

In the bottom section the following reactions occur:

(1) About 50% of the $SO_2$, or 914 lbs./hr. $SO_2$, are oxidized to $SO_3$ and converted to 1400 lbs. $H_2SO_4$ per hour, thus removing 257 pounds of free water.

(2) About 54 pounds per hour of carbonaceous matter is oxidized, forming 170 pounds $CO_2$ and 70 pounds water per hour.

(3) About 500 pounds $N_2O_3$ per hour are absorbed in the acid.

The composition of the acid leaving the bottom of tower 10 will thus be as follows. The recirculation of acid to the bottom section through line 14 does not affect the composition of the acid at the bottom of tower 10.

| | Acid Leaving the Middle Section | | Absorbed in the Bottom Section Lbs./hr. | Acid Leaving the Bottom Section | |
|---|---|---|---|---|---|
| | Wt. percent | Lbs./hr. | | Wt. percent | Lbs./hr. |
| $H_2SO_4$ | 84.5 | 58,830 | 1,400 | 85.1 | 60,230 |
| $H_2O$ | 15.5 | 10,754 | (−187) | 14.9 | 10,567 |
| | 100 | 69,584 | | 100.0 | 70,797 |
| $(CH_2)_n$ | 0.08 | 54 | | | |
| $N_2O_3$ | 5.5 | 3,825 | 500 | 6.1 | 4,325 |
| Total | | 73,463 | 1,713 | | 75,122 |

A small amount of nitrogen oxides is lost from the system in the vent gas which leaves tower 10 through line 12. To compensate for this loss, an aqueous solution of nitric acid is injected into tower 10 through line 16. In the present case, the loss of nitrogen oxides is approximately 25 lbs./hr. and the following quantity of solution of nitric acid is added through line 16. The nitric acid decomposes to form $N_2O_5$, which in turn is reduced to $N_2O_3$.

| | Wt. percent | Lbs./hr. |
|---|---|---|
| $HNO_3$ | 43 | 42 |
| $H_2O$ | 57 | 55 |
| Total | 100 | 97 |

The water obtained from the dilute nitric acid solution is sufficient to reduce the sulfuric acid concentration from 85.1 to 85 wt. percent $H_2SO_4$ in the bottom section of tower 10.

Small amounts of unreacted $SO_2$ are also lost in the vent gases from tower 10, which are of the following approximate composition and quantity.

| Component | Mol percent | Mols/hr. | Lbs./hr. |
|---|---|---|---|
| NO | 0.1 | 0.3 | 10 |
| $NO_2$ | 0.1 | 0.3 | 15 |
| $SO_2$ | 0.2 | 0.5 | 36 |
| $CO_2$ | 1.5 | 3.9 | 170 |
| $O_2$ | 5.4 | 13.7 | 438 |
| $N_2$ | 92.7 | 236.5 | 6,620 |
| Total | 100.0 | 255.2 | 7,289 |

The gases which enter the top absorber section at 122° F., contain about 125 lbs./hr. nitrogen oxides, as well as the $CO_2$ formed in the oxidation of the carbonaceous matter. The gases are cooled to approximately 90° F. in the top section, while being scrubbed by the alcohol black acid feed. The acid in turn is heated to approximately 122° F. in cooling the gases and in absorbing nitrogen oxides, before flowing from the top to the middle section. The acid picks up about 100 lbs./hr. of nitrogen oxides in the absorber section. This represents approximately 80% of the total amount of nitrogen oxides in the gas entering the top absorber section. The loss of nitrogen oxides amounts to approximately 25 lbs./hr., which is approximately 3% of the total nitrogen oxides entering tower 10 through line 22. The acid flowing from the top of the middle section contains approximately 0.9 wt. percent $N_2O_3$, as previously indicated.

The 85% strength decarbonized acid withdrawn through line 19 contains the 8320 lbs./hr. $H_2SO_4$ originally present in the alcohol black acid feed, as well as the 2800 lbs./hr. $H_2SO_4$ formed by oxidation of $SO_2$ to $SO_3$ in tower 10. As previously indicated, this acid contains 6.1 wt. percent $N_2O_3$ in solution and enters line 19 at a temperature of 160° F. The acid in line 19 is quite clear but may still contain traces of carbonaceous matter, which impart a yellow or brown color to the final denitrated acid, if not removed. In order to remove the last traces of carbonaceous matter before denitration, the acid from line 19 is passed through a heater H–1, in which the acid is heated from 160° to 300° F. From H–1, the heated acid passes through line 20 into a holding tank 37, in which the acid is held for a period of time, usually about 30 minutes, in order to complete the oxidation of the last traces of carbonaceous matter. The completely decarbonized acid passes from holding tank 37 through line 21 into the denitration tower 38.

In order to obtain effective denitration of the decarbonized acid, it is necessary to dilute the acid to about 68% $H_2SO_4$ strength and to strip the diluted acid with a large volume of gas, to remove the nitrogen oxides from the acid solution. Effective denitration cannot be obtained at sulfuric acid strengths much above 70% $H_2SO_4$, owing to the stability of the chemical complex formed by $N_2O_3$ with $SO_3$ or $H_2SO_4$. The addition of water to dilute the sulfuric acid to about 68 to 70% $H_2SO_4$, weakens the chemical bond between $N_2O_3$ and $SO_3$ and makes it possible to achieve almost complete stripping of the nitrogen oxides from the sulfuric acid solution.

The denitration tower 38 contains two packed sections as indicated. Gas for stripping the nitrogen oxides from the diluted acid enters tower 38 through line 27 at a point located below the lower packed section. The gas for this purpose is obtained by the combustion of sulfur with an excess of air to produce $SO_2$ in the combustion chamber 36. The hot gases from combustion chamber 36 pass through line 29 into the acid concentrator 39, where the heat in the gases is used to evaporate water from the 68% strength denitrated sulfuric acid, in order to raise its concentration to 78% $H_2SO_4$. The concentration of the sulfuric acid is effected under a pressure of approximately 9 p.s.i.g. and at a temperature of approximately 340° F. The gases from the concentrator 39 enter the denitration tower 38 through line 27 under these conditions of temperature and pressure, the following being the composition and quantity of these gases, which occupy a volume of 2720 c.f.m. at flowing conditions.

*Gases entering denitration tower 38 through line 27 at 9 p.s.i.g. and 340° F.*

| Component | Mol percent | Mols/Hr. | Lbs./hr. |
|---|---|---|---|
| $SO_2$ | 6.8 | 29.1 | 1,864 |
| $O_2$ | 7.8 | 33.4 | 1,068 |
| $N_2$ | 55.2 | 236.5 | 6,620 |
| $H_2O$ | 30.2 | 129.8 | 2,336 |
| Total | 100.0 | 428.8 | 11,888 |

The denitration tower 38 is operated in such a manner that the water vapor contained in the stripping gases entering through line 27 is completely condensed in the lower section of tower 38. The amount of water removed from the acid in the concentrator 39 is controlled so that the decarbonized 85% $H_2SO_4$ entering tower 38 through line 21 is diluted to 68% $H_2SO_4$, by condensation of the water passing from concentrator 39 to tower 38 through line 27. The denitrated 68% $H_2SO_4$ passes from the bottom of tower 38 into line 25 at a temperature of 160° F. Part of the 68% acid is recycled back to the tower 38 through line 24, cooler C–3 and line 23 and the denitrated 68% $H_2SO_4$ product is transferred to the acid concentrator 39 through line 26.

The recirculated 68% acid is cooled from 160° to 105° F. in cooler C–3 and the cooled acid, amounting to approximately 144,000 lbs./hr., is injected into tower 38 at a point between the upper and lower packed sections. The recirculated 68% $H_2SO_4$ is mixed at this point with the 13,880 lbs./hr. of decarbonized 85% $H_2SO_4$ containing 6.1% $N_2O_3$, which enters tower 38 through line 21 at a temperature of 300° F., at a point located above the upper packed section of tower 38. As the hot 85% $H_2SO_4$ flows down over the packing in the upper section of tower 38, it scrubs the gases passing upwards from the lower section and removes the small amount of water vapor remaining in the gases leaving the lower section of tower 38. The blending of the 85% $H_2SO_4$ from line 21 with the 68% $H_2SO_4$ from line 23, results in the formation of acid of approximately 69% $H_2SO_4$ concentration. The heat liberated in the dilution of the 85% $H_2SO_4$ to 69% $H_2SO_4$ causes part of the nitrogen oxides in solution in the 85% $H_2SO_4$ to be released from the acid solution. Complete stripping of the nitrogen oxides from the diluted acid is effected as the acid flows downwards over the packing in the lower section of tower 38. As the diluted acid meets the gases entering tower 38 through line 27, the water vapor contained in the gases is condensed, with the result that the acid is further diluted from 69% $H_2SO_4$ to approximately 68% $H_2SO_4$. The diluted acid flows over the packing in the lower section of tower 38 at a temperature of approximately 160° F., at which temperature the 68% $H_2SO_4$ can be stripped very completely of nitrogen oxides by means of the noncondensible gases entering tower 38 through line 27.

The temperature of the denitrated 68% acid leaving the bottom of tower 38 is controlled by the amount of 68% acid recirculated to tower 38 through line 24, cooler C–3 and line 23. Cooler C–3 must remove all the heat liberated in tower 38 by the following processes:

(1) The cooling of the 85% $H_2SO_4$ from 300° F. to 160° F. and the heat of dilution of 85% $H_2SO_4$ to 68% $H_2SO_4$.

(2) The cooling of the water vapor in the gases entering tower 38 through line 27 and the latent heat of condensation of the water vapor at 160° F.

(3) The cooling of the noncondensible gases entering tower 38 through line 27 from 340° to 300° F.

Against the above mentioned exothermic processes, allowance must be made for the heat absorbed by the dissociation of the complex $N_2O_3.2SO_3$ to $N_2O_3$ and $2SO_3$, the stripping of the $N_2O_3$ from the acid solution and the dissociation of the gaseous $N_2O_3$ to NO and $NO_2$.

The denitrated 68% $H_2SO_4$, which flows from tower 38 through lines 25 and 26 to the acid concentrator 39, has the following composition and quantity:

| | Wt. percent | Lbs./hr. |
|---|---|---|
| $H_2SO_4$ | 67.8 | 11,120 |
| $H_2O$ | 32.2 | 5,292 |
| Total | 100.0 | 16,412 |

The hot gases entering concentrator 39 through line 29 are formed by the combustion of sulfur with air in combustion chamber 36. Approximately 932 lbs./hr. sulfur, charged to combustion chamber 36 through line 35, are burned with 8800 lbs./hr. of air, which enters chamber 36 through line 34. The combustion is effected at a temperature of approximately 1800° F. and under a pressure of about 10 p.s.i.g. The quantities and composition of materials entering and leaving the combustion chamber 36 are approximately as follows:

| | Feed | | | Products | | |
|---|---|---|---|---|---|---|
| | Mol percent | Mols/hr. | Lbs./hr. | Mol percent | Mols/hr. | Lbs./hr. |
| Sulfur | | | 932 | | | |
| $SO_2$ | | | | 9.5 | 29.1 | 1,864 |
| $O_2$ | 20.3 | 62.5 | 2,000 | 10.8 | 33.4 | 1,068 |
| $N_2$ | 76.5 | 236.5 | 6,620 | 76.5 | 236.5 | 6,620 |
| $H_2O$ | 3.2 | 10.0 | 180 | 3.2 | 10.0 | 180 |
| Total | 100.0 | 309.0 | 9,732 | 100.0 | 309.0 | 9,732 |

The hot gases from combustion chamber 36 still contain 10.8 mol percent of unreacted oxygen, which is required to oxidize the $SO_2$ and carbonaceous matter in tower 10 and to provide about 5 mol percent unreacted oxygen in the vent gases leaving tower 10 through line 12. The hot gases also contain 180 lbs./hr. water vapor, which was present in the air charged to chamber 36. This water vapor is absorbed in the acid in tower 38, together with the water vapor formed in concentrator 39, by concentration of the denitrated acid from 68% $H_2SO_4$ to 78% $H_2SO_4$. Approximately 2156 lbs./hr. water are vaporized from the denitrated acid in the concentrator 39, so that the total quantity of water entering tower 38 through line 27 is 2336 lbs./hr.

In addition to removing water from the denitrated 68% $H_2SO_4$, the concentration of the acid at 340° F. in concentrator 39, provides an additional safety factor for the complete removal of the last traces of nitrogen oxides from the decarbonized, denitrated acid product. The acid product flows from concentrator 39 through line 31 to a pressure equalizing tank 40, in which a level of hot acid product is maintained. Tank 40 is connected to concentrator 39 by means of a pressure equalizing line 30, through which gas can flow as required to equalize the pressures in tank 40 and concentrator 39.

The final acid product flows from tank 40 to storage through line 32, cooler C–4 and line 33. The composition and quantity of acid product is as follows:

| | Wt. percent | Lbs./hr. | Ton/day |
|---|---|---|---|
| $H_2SO_4$ | 78 | 11,120 | 133.44 |
| $H_2O$ | 22 | 3,136 | 37.63 |
| Total | 100 | 14,256 | 171.07 |

Of the final 78% $H_2SO_4$ product amounting to 11,120 lbs./hr. $H_2SO_4$ (100%), approximately 75% or 8320 lbs./hr. $H_2SO_4$ was contained in the alcohol black acid feed and the balance of 2800 lbs./hr. $H_2SO_4$ was made from sulfur charged to the combustion chamber 36.

The decarbonization of alcohol black acid is an ideal application of the process, since the spent acid enters at 78% strength and the final decarbonized product leaves as acid of the same concentration. However, the same process may be used for decarbonization of weaker or stronger acids, as well as for decarbonization of acids which contain a greater concentration of carbonaceous matter than alcohol black acid. Thus alcohol sludge acid, which consists of 50% $H_2SO_4$ containing about 6.7 wt. percent carbonaceous matter, may be decarbonized and concentrated to 78% strength by means of the process described. In the case of alcohol sludge acid, a greater quantity of water is produced by oxidation of the contained carbonaceous matter, than is the case with alcohol black acid, which contains only 0.5% carbonaceous matter in 78% $H_2SO_4$. It is also necessary to react a considerably greater proportion of the water originally present in the 50% strength alcohol sludge acid with $SO_3$, to raise the concentration of the acid above 80% $H_2SO_4$ for decarbonization in tower 10, than is the case with 78% strength alcohol black acid. The overall effect is to produce a considerably greater proportion of new acid from sulfur or $SO_2$ when decarbonizing alcohol sludge acid, than when decarbonizing alcohol black acid.

The following table shows the composition of alcohol sludge acid, the quantity of water which is formed by oxidation of the carbonaceous matter and the total amount

| | Composition of Alcohol Sludge Acid | | Water formed by Oxidation of Carbonaceous Matter, Tons | 85% $H_2SO_4$ Available from Alcohol Sludge Acid | | Total Excess Water to be reacted with $SO_3$ to form 85% $H_2SO_4$, Tons |
|---|---|---|---|---|---|---|
| | Wt. Percent | Tons | | Wt. Percent | Tons | |
| $H_2SO_4$ | 46.88 | 46.88 | | 85 | 46.88 | |
| $H_2O$ | 46.88 | 46.88 | 8.02 | 15 | 8.27 | 46.63 |
| $(CH_2)_n$ | 6.24 | 6.24 | | | | |
| Total | 100.00 | 100.00 | 8.02 | 100 | 55.15 | 46.63 |

of water which must be reacted with $SO_3$ to raise the concentration of the acid mixture to 85% $H_2SO_4$.

The above figures illustrate that if 100 tons of alcohol sludge acid are oxidized and reacted with $SO_3$ to raise the overall concentration to 85% $H_2SO_4$, it will be necessary to react a total of 46.63 tons of water with $SO_3$ to form 85% $H_2SO_4$, as follows:

| | Excess Water, Tons | $SO_3$ Required, Tons | 85% $H_2SO_4$ Produced | |
|---|---|---|---|---|
| | | | Wt. Percent | Tons |
| $H_2SO_4$ | | | 85 | 129.49 |
| $H_2O$ | 46.63 | | 15 | 22.85 |
| $SO_3$ | | 105.71 | | |
| Total | 46.63 | 105.71 | 100 | 152.34 |

In the case of alcohol sludge acid, the ratio of new acid produced to acid contained in the spent acid feed is 129.49 to 46.88 or 2.76 to 1, whereas in the case of alcohol black acid, the corresponding ratio was 33.6 to 100 or only 0.34 to 1. The plant would be operated in exactly the same manner for alcohol sludge acid as for alcohol black acid, except that a greater proportion of sulfur would be burned per unit of $H_2SO_4$ in the spent acid feed.

In cases where a relatively weak acid, such as alcohol sludge acid, is to be decarbonized, it is sometimes desirable to increase the strength of the spent acid, before it is charged to the decarbonization unit, by blending it with a strong spent acid, such as spent alkylation acid, which contains about 88% $H_2SO_4$, 4% $H_2O$ and 8% carbonaceous matter. Thus if 1 ton of alcohol sludge acid is blended with 2 tons of spent alkylation acid, the blend of spent acids will contain 74.3% $H_2SO_4$ and 7.4% carbonaceous matter, as indicated in the following table:

| Component | Alcohol Sludge Acid | | Spent Alkylation Acid | | Spent Acid Blend | |
|---|---|---|---|---|---|---|
| | Wt. Percent | Tons | Wt. Percent | Tons | Wt. Percent | Tons |
| $H_2SO_4$ | 46.88 | 0.47 | 88 | 1.76 | 74.3 | 2.23 |
| $H_2O$ | 46.88 | 0.47 | 4 | 0.08 | 18.3 | 0.55 |
| $(CH_2)_n$ | 6.24 | 0.06 | 8 | 0.16 | 7.4 | 0.22 |
| Total | 100.00 | 1.00 | 100 | 2.00 | 100.0 | 3.00 |

If 100 tons of the above spent acid blend is decarbonized according to the process described, the requirements of $SO_3$ and the new acid produced will be as shown in the following tables:

| Component | Spent Acid Blend, Tons | Water Produced in Oxidation of Carbonaceous Matter, Tons | 85% $H_2SO_4$ Available from Spent Acid Blend | | Excess Water to be reacted with $SO_3$ to Produce 85% $H_2SO_4$, Tons |
|---|---|---|---|---|---|
| | | | Wt. percent | Tons | |
| $H_2SO_4$ | 74.3 | | 85 | 74.3 | |
| $H_2O$ | 18.3 | 9.5 | 15 | 13.1 | 14.7 |
| $(CH_2)_n$ | 7.4 | | | | |
| Total | 100.0 | 9.5 | 100 | 87.4 | 14.7 |

| | Excess Water, Tons | $SO_3$ Required, Tons | 85% $H_2SO_4$ Produced from $SO_3$ | |
|---|---|---|---|---|
| | | | Wt. percent | Tons |
| $H_2SO_4$ | | | 85 | 40.8 |
| $H_2O$ | 14.7 | | 15 | 7.2 |
| $SO_3$ | | 33.3 | | |
| Total | 14.7 | 33.3 | 100 | 48.0 |

In the case of the spent acid blend, the ratio of new acid to acid in the spent acid feed is 40.8 to 74.3 or 0.55 to 1.0. The requirements of sulfur for combustion is thus much less per unit of acid product, than is the case when the alcohol sludge is decarbonized alone.

Greater quantities of spent alkylation acid can be added to a decarbonization process of this type, if desired, since the formation of water, by oxidation of the carbonaceous matter in the spent alkylation acid, will reduce the concentration of the spent alkylation acid to only 86% $H_2SO_4$, as indicated in the following table:

| | Spent Alkylation Acid | | Water Formed by Oxidation of Carbonaceous Matter, Tons | Acid Resulting from Oxidation | |
|---|---|---|---|---|---|
| | Wt. percent | Tons | | Wt. percent | Tons |
| $H_2SO_4$ | 88 | 88 | | 86 | 88 |
| $H_2O$ | 4 | 4 | 10.3 | 14 | 14.3 |
| $(CH_2)_n$ | 8 | 8 | | | |
| Total | 100 | 100 | 10.3 | 100 | 102.3 |

The limit to the amount of spent alkylation acid that can be added to a system of this type, is the amount of heat available for concentrating the denitrated 68% $H_2SO_4$ to 78% $H_2SO_4$. The addition of spent alkylation acid to the process can thus reduce, but not entirely eliminate, the use of sulfur for combustion purposes, to provide heat for acid concentration. Some formation of new acid, by oxidation of $SO_2$ to $SO_3$, is always necessary, the most desirable ratio being about 1 ton of new $H_2SO_4$ from $SO_2$ to 3 tons of $H_2SO_4$ from the spent acid feed, as in the decarbonization of alcohol black acid.

As aforesaid, the decarbonization process embodied herein is normally carried out at temperatures of from about 100 to about 300° F., though temperatures above 300° F. may be employed. However, it is preferred to decarbonize spent acids at temperatures below 300° F., with approximately 80 to 90% strength $H_2SO_4$ containing about 5 to 7 wt. percent $N_2O_3$ in solution, since $SO_2$ and oxygen dissolve at the desired rate and oxidation of $SO_2$ and carbonaceous matter proceed at a rapid rate under these conditions. A further important consideration for operating at reduced temperatures is the fact that problems with materials of construction are minimized by operating at lower temperatures.

When present in the proper proportions, NO and $NO_2$ dissolve in sulfuric acid containing 80 to 90% $H_2SO_4$ to form $N_2O_3$ in amounts suitable for carrying out this invention. Although it is not intended that the invention be bound by any theory relating to the mechanism of the reactions that occur to effect the decarbonization of spent acids, it is believed that the dissolved $N_2O_3$ reacts with $SO_3$ or $H_2SO_4$ in the system to form a stable complex having a vapor pressure lower than that of $N_2O_3$ or of the individual oxides, NO or $NO_2$; that oxidation of the $SO_2$ to $SO_3$ reduces the complex to a lower state of oxidation; and that the dissolved oxygen immediately restores the complex to its former state of oxidation, whereby liberation of less soluble, lower oxides of nitrogen from the the solution does not occur to any important extent; and that the complex of $N_2O_3$ with $SO_3$ or $H_2SO_4$ serves also to oxidize the carbonaceous matter in the spent acid.

In practice of an embodiment of the invention as aforedescribed, in which formation of sulfuric acid and decarbonization of spent sulfuric acid occur simultaneously and in which $SO_2$-containing feed gases are employed for concentrating and denitrating the decarbonized acid, numerous advantages result. Thus by practice of the invention in an embodiment as aforedescribed, external heat or fuel requirements for concentrating the denitrated acid from 68% to 78% sulfuric acid are eliminated or greatly minimized, as the heat required for this purpose is provided by combustion of sulfur to supply $SO_2$ to the system.

Although the use of nitric acid has been described for supply of make-up requirements of nitrogen oxides to the system, other sources of nitrogen oxides may be used. Thus oxides of nitrogen, produced by catalytic oxidation of ammonia, may be introduced directly into tower 10, instead of adding an aqueous solution of nitric acid.

With reference to the strength of acid used for the decarbonization treatment, it is preferred that the acid have a sulfuric acid content of about 83 to 85%, although an acid of 80 to 90% strength may be used. An acid of not over about 85% $H_2SO_4$ strength is preferred, however, as with more concentrated acids, the solubility of $SO_2$ in the reaction liquid appears to decrease, resulting in increased losses of $SO_2$; and with acids of less than 83% concentration of $H_2SO_4$ and less than about 5 weight percent of dissolved $N_2O_3$, the partial pressures of nitrogen oxides above the acid solution appear to increase, with correspondingly increased losses of nitrogen oxides.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A process for decarbonizing a spent sulfuric acid containing carbonaceous matter and about 80 to 90% sulfuric acid which comprises contacting said acid, containing from about 3 to about 10 weight percent of dissolved dinitrogen trioxide, at a temperature of from about 100 to about 300° F. with air in amount to maintain an excess of free oxygen and sulfur dioxide to dissolve sufficient oxygen and sulfur dioxide in said acid solution whereby carbonaceous matter in said solution is oxidized to carbon dioxide and water and simultaneously dissolved sulfur dioxide is oxidized to react with water in the solution and form sulfuric acid in an amount sufficient to maintain the sulfuric acid content of said solution at from about 80 to about 90 weight percent, and recovering a decarbonized sulfuric acid of about 80 to 90 weight percent of sulfuric acid containing dissolved dinitrogen trioxide.

2. A process, as defined in claim 1, wherein the decarbonized sulfuric acid is denitrated to remove dissolved oxides of nitrogen.

3. A process, as defined in claim 1, wherein the acid solution subjected to contact with air and sulfur dioxide contains from about 5 to about 7 weight percent of dinitrogen trioxide in solution, and the acid solution is maintained at a sulfuric acid concentration of from about 82 to about 86 weight percent.

4. A continuous process for decarbonizing spent sulfuric acid containing carbonaceous matter which comprises continuously adding said spent acid to a solution of sulfuric acid of from about 80 to about 90 weight percent of sulfuric acid and containing from about 3 to about 10 weight percent of a dissolved nitrogen oxide, continuously contacting the resulting mixture at from about 100 to about 300° F. with an excess of a free oxygen-containing gas, sulfur dioxide and an oxide of nitrogen to dissolve oxygen, sulfur dioxide and nitrogen oxide in said mixture, whereby carbonaceous matter is oxidized to carbon dioxide and water and simultaneously dissolved sulfur dioxide is oxidized to sulfur trioxide for reaction with water in said mixture to form sulfuric acid in an amount sufficient to maintain the mixture at a sulfuric acid content of about 80 to about 90 weight percent, and withdrawing from said mixture a substantially decarbonized sulfuric acid of from about 80 to about 90 weight percent of sulfuric acid and containing a dissolved oxide of nitrogen, said withdrawal of decarbonized acid being correlated with the addition of spent acid to the sulfuric acid containing the dissolved oxide of nitrogen such that the resulting mixture contacted by the aforesaid gases is maintained at a sulfuric acid content of from about 80 to about 90 weight percent and contains from about 3 to about 10 weight percent of an oxide of nitrogen.

5. A continuous process for decarbonizing spent sulfuric acid containing carbonaceous matter which comprises maintaining at from 100 to 300° F., in the bottom portion of a vertically elongated oxidizing zone, a sulfuric acid solution of from about 80 to 90 weight percent of sulfuric acid and from about 3 to about 10 weight percent of dissolved dinitrogen trioxide, continuously adding spent acid containing carbonaceous matter to the top portion of said zone whereby said spent acid flows downwardly and admixes with said sulfuric acid solution, continuously contacting said solution in the bottom portion of said oxidizing zone with an excess of air, sulfur dioxide and an oxide of nitrogen to countercurrently contact the downwardly flowing acid admixture and dissolve oxygen, sulfur dioxide and nitrogen oxide in said admixture whereby dissolved oxygen oxidizes carbonaceous matter in the admixture to carbon dioxide and water and simultaneously dissolved sulfur dioxide is oxidized to sulfur trioxide which reacts with water in the admixture to form sulfuric acid in an amount sufficient to maintain the acid solution in the bottom portion of said zone at a sulfuric acid content of from about 80 to about 90 weight percent and to maintain from about 3 to about 10 weight percent of a dissolved oxide of nitrogen in said acid solution, and continuously withdrawing from the bottom portion of said zone a substantially decarbonized solution of sulfuric acid of about 80 to about 90 weight percent sulfuric acid in which from about 3 to about 10 weight percent of dinitrogen trioxide is dissolved.

6. A process, as defined in claim 5, wherein the decarbonized sulfuric acid containing dissolved dinitrogen trioxide is denitrated by contacting the acid with a gaseous mixture comprising sulfur dioxide and oxygen, to provide a denitrated sulfuric acid and a gaseous mixture comprising oxygen, sulfur dioxide and oxides of nitrogen.

7. A process, as defined in claim 6, wherein the gaseous mixture comprising oxides of nitrogen, sulfur dioxide and oxygen is utilized as the gaseous mixture for contacting the acid solution in the bottom portion of the oxidizing zone.

8. A process, as defined in claim 6, wherein the gaseous mixture utilized for denitrating the decarbonized acid is prepared by combustion of sulfur with excess air.

References Cited in the file of this patent

UNITED STATES PATENTS

| | | |
|---|---|---|
| 2,390,316 | Mottern | Dec. 4, 1945 |
| 2,588,331 | Titlestad | Mar. 4, 1952 |

FOREIGN PATENTS

| | | |
|---|---|---|
| 348,866 | Great Britain | May 21, 1931 |
| 672,723 | Great Britain | May 28, 1952 |